June 5, 1962
A. STOY
3,037,240
METHOD AND APPARATUS FOR MANUFACTURING SHAPED
ARTICLES FROM SOLUTIONS OF ACRYLONITRILE
POLYMERS AND COPOLYMERS
Filed Nov. 19, 1959
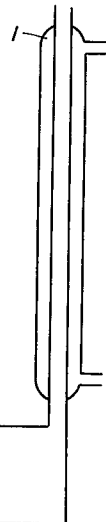
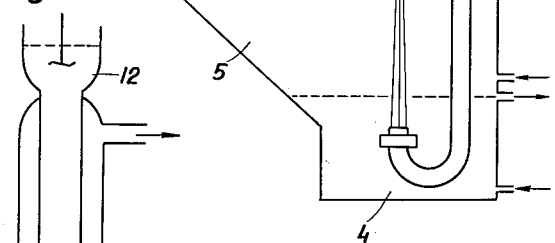
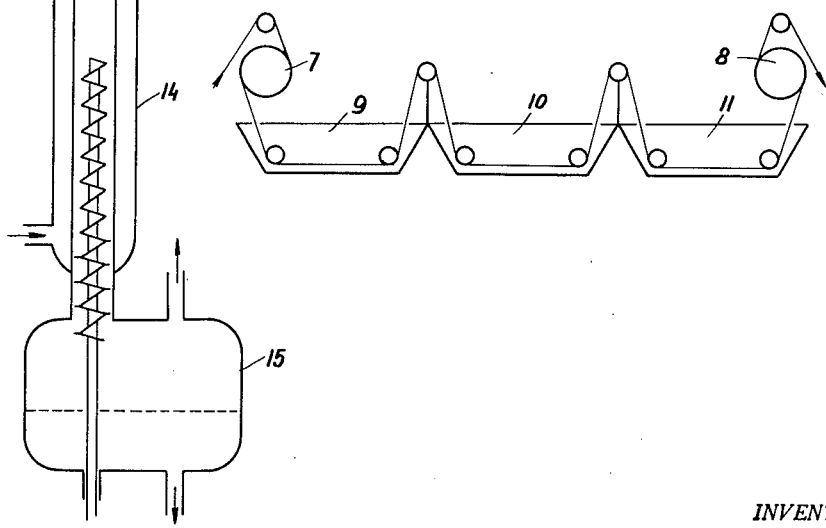
INVENTOR.
ARTUR STOY
BY
Michael S. Striker
Attorney

United States Patent Office 3,037,240
Patented June 5, 1962

3,037,240
METHOD AND APPARATUS FOR MANUFACTURING SHAPED ARTICLES FROM SOLUTIONS OF ACRYLONITRILE POLYMERS AND COPOLYMERS
Artur Stoy, No. 7 Farni, Prague-Stresovice, Czechoslovakia
Filed Nov. 19, 1959, Ser. No. 854,136
Claims priority, application Czechoslovakia Nov. 24, 1958
11 Claims. (Cl. 18—8)

It is known from U.S. Patents Nos. 2,140,921 (Rein) and 2,356,767 (Kropa) that polyacrylonitrile is soluble in highly concentrated aqueous solutions of certain inorganic salts such as zinc chloride to spinnable solutions. Furthermore it is taught by Stanton et al. in U.S. Patent No. 2,648,646 that a part of zinc chloride or of another solvent salt may be advantageously replaced by other salts forming highly hydrated ions but not dissolving polyacrylonitrile as such; among suitable salts of this kind calcium chloride is of most importance. Besides of that it has been reported by Kropa in U.S. 2,356,767, 2,425,191 and 2,425,192 that spinnable solutions of acrylonitrile polymers and copolymers may be obtained by polymerizing monomeric material in highly concentrated zinc chloride or similar solutions with a persulfate as initiator at temperatures usually between 30 and 50° C. Stanton et al. improved in U.S. 2,648,647 this method by using mixtures of zinc chloride with calcium or magnesium chloride or, if desired, mixtures of other similar salts, instead of zinc chloride alone.

The same team research workers described in U.S. 2,648,649 acrylonitrile polymers and copolymers plasticized with from about 6 to 20 percent of inorganic salts of the above mentioned kind in aqueous solutions. Some of said plasticized polymers are reported as rubbery or soft-rubbery, e.g. polyacrylonitrile containing 10 percent of zinc chloride, 5 percent of calcium chloride and 10 percent of water (by weight). No particular use of such rubbery salt-plasticized acrylonitrile polymers has been reported hitherto.

In spite of the above disclosures the polymerization and copolymerization of acrylonitrile in aqueous inorganic salt solutions has not found its way into industrial use, the properties of the obtained fibres having been rather poor. Particularly the molecular weight distribution was found unfavorable, this phenomenon has not been, however, fully explained. Thus the only way to use aqueous inorganic salt solutions as polyacrylonitrile solvents, practiced in semi-industrial or industrial scale, is to prepare acrylonitrile polymers and copolymers in usual way, i.e. by either redox or hydrogen peroxide polymerization, filtering the finely divided polymer off, washing it thoroughly, drying it cautiously, grinding the resulting crumbs to fine powder, which is eventually dissolved in a brine of said inorganic salts. The solution of the polymer with average molecular weight of between 30,000 and 120,000 is then spun through usual spinnerets into an aqueous coagulating bath, advantageously cooled down to about 0° C., and the obtained fibres or filaments are then oriented by drawing in boiling water to several hundred percent of their original length. The fibres may be, if desired, further drawn in dry condition at temperatures of from about 120 to 160° C. and stabilized by heating them to a still higher temperature in unstretched condition. This method, however, has the disadvantage of a rather complicated process of preparing spinnable solutions from monomeric material. Moreover the obtained fibres are often more or less unhomogeneous containing very small voids after salts removed in the spinning bath. The unhomogenity reveals itself by white color or at least by opaque appearance and by decreased specific weight, and causes a substantial decrease of tensile strength and other desirable properties, particularly of knot tensile strength.

Now a new method has been found yielding very strong, pliable, transparent and homogeneous fibres or other shaped articles from acrylonitrile polymers and copolymers dissolved in highly concentrated aqueous inorganic salt solutions, the polymer or copolymer solutions being prepared either by dissolving a separately prepared polymer or copolymer, or by polymerizing or copolymerizing acrylonitrile monomer directly in highly concentrated aqueous solutions of suitable inorganic salts such as zinc chloride alone or mixed, if desired, with calcium chloride, and by treating the obtained solutions with suitable coagulating bath capable of dissolving said salts. The new method consists in extruding said solutions into a coagulating bath capable of dissolving said salts contained in the polymer solution, e.g. into a diluted aqueous solution of the same salts, carrying out the coagulation therein but partially, advantageously so that the shaped article contains, after removal of remaining coagulating bath from its surface, about 15 percent up to 30 percent of the polymeric substance, and from about 70 to 85 percent of both salts and water, removing the bath substantially from the article surface, keeping the shaped article dry so as to avoid the salts being exuded, till the article becomes rubber, extending the obtained rubbery article and removing substantial part of remaining salts by washing the article in extended condition.

Elastically extended articles, particularly filaments and fibres, are transformed by washing to permanently oriented ones. Surprisingly the effect of washing out salts from the extended article is much better than that of washing articles, e.g. fibres, where the macromolecules are not oriented. It has been established that strong intermolecular cohesion aids the hydrated metal ions being squeezed out from the structure when extended linear macromolecules approach together at certain distance. It is therefore much more advantageous to wash out salts from the article oriented by extension than to remove salts from unoriented article before orientation. The process of forming oriented shaped articles, such as fibres and filaments, is thereby substantially simplified. Further advantages of the new method will be shown in further description.

It is particularly advantageous to prepare solutions of acrylonitrile polymers or copolymers by polymerizing or copolymerizing monomeric material in concentrated aqueous solutions of inorganic salts, such as of a mixture of zinc chloride and calcium chloride, provided that the polymerization is carried out so as to avoid excessive branching of macromolecules.

It is then possible to polymerize to very high polymerization degrees, e.g. 100,000–200,000 or even more. Unbranced linear polymers are soluble even at molecular weight as high as 5,000,000 or 10,000,000 without building gels. Gels with three-dimensional structure impair the filtrability and often make spinning of fine filaments quite impossible. The new process in which the shaped articles are primarily but partially coagulated, is the only one which makes possible the use of such extremely high polymers for manufacturing fibres, filaments and other shaped articles with oriented molecular structure. The salts may be removed from the article either partially or fully according to desired properties and purity degree of the final products.

The branching avoiding conditions involve certain measures known per se to those skilled in art but not yet used hitherto in such an extent, especially regarding the temperature which is maintained during the polymerization. Said conditions may be defined as follows:

(a) Low free radical concentration caused by very low heavy metal ions concentration;

(b) Low polymerization temperature till to about −20° C.;

(c) Addition of modifiers or regulators more readily undergoing the transfer reactions with free radicals than monomeric or polymeric acrylonitrile. Suitable modifiers are e.g. glycols, lower aliphatic alcohols, polyalkylene glycols, chlorylhydrate, diethylchloroacetamide, aliphatic or cyclic ketones, formaldehyde and many other organic compounds with active hydrogen or halogen atoms.

It has been found that some unfavorable properties of acrylonitrile polymers and copolymers prepared by polymerizing monomeric material in inorganic salt solutions by the methods known hitherto are caused by excessive branching which originates from free radical transfer onto both monomer and polymer. The use of above listed measures, separately or in combination, removes branching, forming of insoluble gels, too large and irregular molecular weight distribution and thus the bad properties of shaped articles made from such polymer solutions. Radical polymerizations are usually not carried out at temperatures under +20° C. because of decreased reaction rate. It has been established, however, that peroxidic compounds are split to free radicals more readily in concentrated zinc chloride or other salt solutions than in water alone and that particularly redox initiators are so efficient in said medium that the polymerization may be carried out at temperatures under zero without difficulties. While decreased temperature decreases the reaction rate, increasing concentration of heavy metal ions increases it; in this way any desirable rate of polymerization may be achieved by balancing mutually said two factors. So substantially the same effect may be obtained either by polymerizing at higher temperature, e.g. at +30° C. and at very low heavy metal concentration, or at lower temperatures, e.g. at −10° C. and at increased heavy metal ions concentration. From heavy metals catalyzing the splitting the peroxidic binding between two oxygen atoms, copper, iron and more-than-bivalent manganese are most effective.

The polymerizing systems with redox initiators are more sensible to the concentration of heavy metal ions than that with persulfate or hydrogen peroxide alone. By way of example, if acrylonitrile is polymerized in a concentrated zinc chloride and magnesium chloride solution (1:1 by volume) with ammonium persulfate and potassium pyrosulfite in the presence of 0.0025 percent (by weight) of cupric chloride-dihydrate, the polymerization runs through in less than two minutes, about 40 percent of acrylonitrile remaining unpolymerized. Although the resulting polymer possesses average molecular weight of about 1,000,000, i.e. much more than could be expected regarding the free radical concentration, it has no favorable fibre forming properties. If, however, the same experiment is carried out without adding cupric chloride, the polymerization runs through in 15 minutes with an extent of over 90 percent. The polymer has high fibre forming properties and its molecular weight is comparatively lower, regarding the free radical concentration. Similar result may be obtained, however, even with cupric chloride added, if the temperature is maintained during the polymerization under −5° C.

The cooling of the polymerizing solution is useful and often necessary as the polymerization heat increases the temperature and thus the reaction rate in a way rather similar to autocatalytic reactions. The increased polymerization rate is caused mainly by increasing free radical concentration since the non-polar splitting of the peroxidic binding between two oxygen atoms is strongly dependent on temperature, much more than the reaction of free radicals with the monomer in the propagation step. The cooling results, however, in risen polymerization degree, the average molecular weight reaching unusually high values of from 500,000 to 10,000,000 or even more. This circumstance can be, if desired, checked by higher heavy metal ions concentration as shown above. It has been found, however, that most useful polymers and copolymers are those produced at low free radical concentration, in spite of their high molecular weight. They are, especially when made at low temperature, more linear and stereoregular than others.

The only disadvantage of the unusually high molecular weights is a rather high viscosity of the obtained solutions. Such highly viscous polymer solutions can be deaerated, i.e. made free of gas bubbles, but with difficulty. This disadvantage is, however, of minor importance in the present case, since no gas bubbles are formed during low temperature polymerization. If any further building of gas bubbles is avoided, e.g. so that the polymerization is carried out without stirring in a vessel directly joined with spinning pump and spinneret, the usual deaeration may be omitted entirely.

Another disadvantage of high viscosity spinning solutions could be seen in causing high resistance when extruded through the holes of the spinneret. This disadvantage may be avoided, however, by using spinnerets with holes having comparaitvely large diameter of from 0.2 to 2.0 mm. and extruding the spinning solution into a medium allowing plastic thinning before the coagulation occurs. This may be achieved e.g. by placing the spinneret at the bottom of the bath and maintaining the salt concentration sufficiently high in the neighborhood of the spinneret. Such a suitable concentration may be close to that at which the salt solution begins to dissolve the used polymer or copolymer. Above such concentrated salt solution of high specific weight a comparatively higher layer of a more diluted salt solution serves as coagulating bath. As a non-coagulating medium, allowing plastic thinning before coagulation, also air or other gas may be used like in spinning large nylon monofilaments into a cooling bath placed several centimeters beneath the spinneret, or like in spinning hot solutions of polyethylene or isotactic polypropylene from spinnerets heated to 180° C. into a bath boiling at lower temperature, e.g. according to Austrian Patent No. 197,007. It is also possible to use the known technique of funnel-spinning, practiced in spinning cupriammoniacal cellulose solutions is to a stream of running water. In the present case a more slowly coagulating liquid has to be used, e.g. a salt solution or butanol.

If there are prepared according to the present invention other shaped articles than fibers or filaments, such as rods or tubes, the time required for partial coagulation and for reaching the rubbery state is longer depending on the diameter of the article.

As salts dissolving or diluting acrylonitrile polymers or copolymers zinc chloride and calcium chloride are most suitable, although other salts, such as lithium bromide, aluminium nitrate and others listed e.g. in U.S. Patent No. 2,648,647 may be used if desire.

As free radicals producing initiators different perioxidic compounds together with reducing agents may be used. Suitable peroxidic compounds are e.g. ammonium or potassium persulfate, dibenzoyl peroxide, acrylonitrile peroxide, diacetyl peroxide, cyclohexanone peroxide, methyl ethyl ketone peroxide, peroxides of aliphatic ethers etc. Acrylonitrile peroxide does not need to be added separately; if the acrylonitrile monomer is kept without excluding access of air, a sufficient amount of its peroxide is formed so as to start the polymerization in highly concentrated salt solutions. Among reducing agents alkaline metal sulfites, bisulfites, pyrosulfites, thiosulfates, hydrosufites etc. are very suitable. Other suitable reducing agents are e.g. glucose, formaldehyde-bisulfite etc.

Heavy metal, such as copper or iron ions, are usually present in sufficient amount in order to provide rather high rate of polymerization even if high purity degree starting materials are used. They must be added, if necessary, in high dilution and in accurate amounts. In absence of at least traces of heavy metal ions, e.g. if the polymerization is carried out in a zinc metal vessel, the polymerization rate may be reduced till to zero.

Rubbery shaped articles used according to the present invention as intermediates, differ substantially from rubbery polymers described in U.S. Patent No. 2,648,649. While the known rubbery salt-plasticized polymers contain from about 6 to 20 percent by weight of salts and a minor amount of water, the rubbery intermediates according to the present process contain from about 70 to 85 percent of salts and water and only from about 15 to 30 percent by weight of polymeric substance. The known rubbery polymers are rather soft with rather low elastic elongation but with plastic creep and delayed elastic recovery; the present intermediates are true elastomers with an elastic elongation of from 300 to 800 percent and with instantaneous and almost full elastic recovery, very similar to natural or GRS-rubber or to mildly vulcanized natural or synthetic rubber. They are clear and transparent, usually colorless.

Partial coagulation on the surface causes the original high viscosity polymer solution to shrink in some measure and to turn opaque. After some time of keeping dry the remaining salt solution diffuses evenly throughout the mass which turns to rubbery translucent or transparent matter, the toughness and elastic modulus of which increases with decreasing salt and water content. For fine fibres the required time is from about several minutes to several hours, according to the denier and temperature. For more massive articles it may be as long as several days.

The rubbery intermediate is to be kept dry, any contact with water causing elution of salts from the surface and hardening. The consequences of a short contact with water may be partially outdone by keeping the article dry again for some time, but the resulting matter is more tough and less elastic than before and its size is somewhat reduced. Similarly a prolonged contact with wet atmosphere causes brine exudation and partial or total loss of elastic properties. Normal dry atmosphere with about 40 percent of relative humidity is innocuous, and drying in a drying-chamber, although practicable, is not essential.

In a continual production the coagulating or spinning bath contains always salts carried in by the extruded polymer solution. It is desirable to maintain the salt concentration on uniform level. The path length necessary for desired coagulation degree, i.e. for removing desired part of salts from the extruded filaments or the like, depends mainly on the diameter of the shaped article, on the salt concentration in the bath, on the nature of the bath, i.e. on its salts dissolving power, on the extruding or spinning speed and on the temperature. If said salt concentration is low, the fiber path is short, the surface layer is transitorily more coagulated and the difference in salt concentration between the outer and inner layer is considerable. The fiber has then less tendency to sticking together when kept dry and the required time for becoming rubbery is slightly increased, on the contrary, if the salt concentration of the bath is higher, the fiber path is longer and may be more conveniently regulated. Perfect removal of the bath from the article surface is then still more essential than in the first case and the tendency of thin fibers to stick together is somewhat greater. On the other hand, the time required for reaching rubbery state is shorter. The optimal bath concentration depends also on the fiber thickness (denier), on the path length and on the bath temperature. It may be easily established after a rather short experience, the limits being rather broad. The spinning or extruding speed is maintained as high as possible, being limited only by beginning tearings. The desired salt concentration in the spinning bath is maintained on constant level in known manner by circulating the bath, removing a part thereof for salt recuperation and adding pure water instead. The spinning bath temperature is not at least critical in contradistinction to known processes.

Fibres or filaments after partial coagulation may be deprived of the superficial bath by any appropriate means, e.g. by passing them between rollers coated with porous material such as with viscose sponge, foamed rubber or similar, and particularly by centrifuging. If the partial coagulation was sufficient, the wound up filaments do not stick together after having been kept dry for the required period of time. If some sticking occurs, it may be avoided by applying fine inert powders onto the filament before or during the winding up, for instance fine powdered talc, bentonite or titanium dioxide. Such powders may be applied to if dull fibres are required. In such a case a heat treatment before the orientation can prove itself advantageous in order to secure durable adhesion of the powder to the fibre surface. Dull or spun-dyed fibres or other shaped articles may be obtained by admixing suitable pigments before, during or after polymerization.

Slightly increased temperature accelerates the reaching of the rubbery condition increasing the diffusion rate of the ions in the polymer. This circumstance may be utilized in a fully continual process.

The washing of the extent filaments may be performed either all at once or gradually in two or more subsequent baths. Although the temperature of the first bath may be as high as above 90° C. without impairing the fibre homogenity, it appears to be more advantageous to rise the temperature of the subsequent washing baths gradually. The last washing bath may be kept boiling and one of the middle baths may contain means enhancing the removal of metal ions from the shaped article, e.g. acids or chelating agents.

The filaments may be stabilized by heating in unstretched state or under controlled stretch. If the fibres are cut to staple, the final stabilization may be carried out by hot or boiling bath into which the cut fibres are falling. Alternatively the dry tow may be heat-stabilized before cutting in a known manner.

Unextended rubbery articles are amorphous and do not show any characteristic X-ray pattern. Fully extended rubbery articles display some indistinct circular pattern revealing that some crystallization occurs even in the presence of highly hydrated metal ions. Extended and washed articles, particularly fibres, show X-ray patterns with sharp circles, which are gradually reduced to equatorial sicle-shaped spots when the drawing ratio is increased.

Where in this specification acrylonitrile copolymers are mentioned, there are meant such containing at least 80 percent of the acrylonitrile component, the balance consisting of different monotopically substituted or disubstituted ethylenes, such as vinyl acetate, methyl methacrylate, vinylidene cyanide, vinyl pyridine etc., used either single or in combinations. All percent values are meant by weight, if not defined otherwise, and all temperatures in degrees of Celsius.

*Example 1*

60 ml. aqueous zinc chloride solution, d.=2.001 at 15°, 40 ml. magnesium chloride solution saturated at room temperature and 20 ml. of acrylonitrile are mixed and cooled down to −5°. Thereafter 0.5 ml. aqueous 5 percent ammonium persulfate, 0.25 ml. aqueous potassium pyrosulfite and 0.1 ml. aqueous 0.1 percent copper dichloride-dihydrate solution are added. The polymerization and spinning are carried out by means of a device diagrammatically shown in FIG. 1. The solution is poured into a 12 mm. thick-walled glass tube 1 cooled externally with a mixture of ground ice and sodium chloride and joint directly with a viscose type spinning pump 2. The solution is left unstirred. After about an hour the tube content is turned to a transparent homogeneous highly viscosity mass, which is almost free of monomer and completely free of gas bubbles. At the top of the tube 1 compressed air of about 5 atmospheres is applied to and the spinning pump is put into operation. The spinning solution is forced through a glass tissue filter 3 and through a spinneret 4 provided with holes having 0.8 mm. diameter. The spinneret is placed in the narrowed bottom pool of a rust-free spinning vessel 5. In the neighborhood of the spinneret a mixture of zinc chloride and magnesium chloride solutions of the same ratio as used for preparing the spinning solution, only diluted with about 10 or 15 percent of water are contained, building a heavy bottom layer. This solution does not dissolve the polymer but the diffusion rate of salts from the polymer streams into the solution is very low. Above this solution similar brine in a higher layer is contained, only diluted with 200 percent of water. Both layers are separately slowly circulated without being stirred vigorously, and their concentration is maintained constant. The upper layer is slightly acidified in order to avoid zinc chloride to be hydrolyzed. The fibre path in the bottom layer is from about 5 to 12 cm. long, in the more diluted top layer about 20′ long. The spinning speed is about 40 meters in a minute. The fibre bundle is freed of superficial bath between two rollers 6 provided with a porous layer, and then it is wound onto a bobbin. The remaining bath is removed by centrifuging the wound up bobbins at 3000 r.p.m. The bobbins are then kept dry for several hours. The elastic filament thus formed is then unwound and extended on a device diagrammatically shown on FIG. 2 between two cylinders 7, 8, rotating at different circumferential speed, to about 300 percent of its original length and passed in extended condition through a 40° bath 9 consisting of deionized water slightly acidified with hydrochloride acid. Thereafter the fibre bundle is passed through further two baths 10, 11 consisting of deionized water and having the temperature of 70 and 90° respectively. The fibre bundle is then twisted and spooled onto perforated metallic spools which are subsequently immersed for 2 hours into a boiling water bath containing appropriate sizing composition, and dried. The obtained filament has good plain and knot tenacity, the breaking elongation being about 15 percent.

By way of contrast, if the same polymerization is carried out at room temperature in a flask without cooling, the polymerization causes a considerable rising of temperature till to about 65° during some 6 or 8 minutes. The resulting viscous solution is yellow and contains gas bubbles which cannot be easily removed. A considerable amount of the monomer remains unpolymerized. The solution is unsuitable for making good textile fibres.

If the same polymer solution prepared in cooled vessel is extruded directly into a diluted coagulating bath, it is impossible to obtain sufficiently fine and strong fibres at any economical spinning speed. If, however, usual spinneret with holes having 0.015 diameter is used and the polymer solution is extruded directly into diluted coagulating bath, the spinning speed must be reduced to less than 5 m./min. since otherwise the elementary filaments are frequently torn on the spinneret. In spite of a careful aftertreatment in a manner described above, the obtained fibre quality is poor.

*Example 2*

100 ml. concentrated aqueous solution of zinc chloride, d.=2.0, 100 ml. concentrated aqueous calcium chloride solution, d.=1.43 at 15°, 30 ml. acrylonitrile and 5 ml. cyclohexanone are mixed and cooled to −5°. Thereafter 1 ml. of a 5 percent aqueous ammonium persulfate, 0.5 ml. of 5 percent aqueous sodium thiosulfate and 0.2 ml. of 0.1 percent iron trichloride solutions are added. The cool solution is poured into the tube 1 of the device shown in FIG. 1. The filament is spun like in Example 1, but into a centrifuge of the type used for viscose spinning. The adherent bath is thereby removed. The fibre is kept dry for six hours. The elongated, mildly twisted fibre bundle is passed through an acidified water bath at 20°, further treatment being the same like in Example 1.

*Example 3*

200 ml. of zinc chloride solution and 200 ml. of calcium chloride solution of the same concentration as in Example 2, 60 ml. of acrylonitrile and 8 ml. of freshly distilled methyl methacrylate are mixed together and cooled down to −10°. Thereafter 1 ml. aqueous formaldehyde solution (40 percent), 2 ml. aqueous potassium pyrosulfite solution (5 percent) and 4 ml. aqueous ammonium persulfate solution (5 percent) are added and the mixture is slowly stirred until the temperature rises to 25° and the viscosity visibly increases. Then the flask is cooled externally in order to maintain the temperature between 25 and 30°. After about two hours the polymerization is finished to an extent of about 90 percent. The viscous solution is then deaerated by evacuation and spun through a spinneret provided with holes having 1.0 mm. diameter. The spinning and further treatment is carried out like in Example 2.

*Example 4*

The copolymer solution is prepared in the may described in Example 3 while methyl methacrylate is replaced by the same amount of vinyl acetate and formaldehyde by 12 ml. of chloralhydrate. No heavy metal compound is added and the cooling is more intensive in order not to exceed 15°. The coagulating bath contains about 20 percent of salts, the non-coagulating bottom layer contains 50 percent of salts. The fibre bath is increased to 60 cm. The bath is carefully removed from the fiber surface by three pairs of rollers provided with elastic porous layer. The fibre bundle is then continually passed through a drying chamber onto a system of rollers on a path sufficient to cause uniform plastification of the whole cross section of the fibres by diffusion of remaining hydrated ions. The rubbery fibre leaving the drying chamber contains about 25 percent of the copolymer, 43.5 percent of zinc chloride, 10.0 percent of calcium chloride and 22.5 percent of water. The rubbery fibre bundle is then continually elongated to about 600 percent of its original length, washed and aftertreated like in preceding examples.

*Example 5*

The polymerization of the same mixture like in Example 4 is carried out continually in a device diagrammatically shown in FIG. 3. The freshly prepared monomer solution, cooled to −10° is continually mixed with the initiator solution in the flask 12 of the jacketed tube 13, provided in its lower part by a slowly driven, tightly fitting screw 14. The tube is cooled by a brine. The viscous copolymer solution flows through a deaerating space 15 into the spinning pump of the device shown in FIG. 1. At a given size of the tube 13 the output of the screw 14 is the same as the output of the spinning pump, the polymerization rate being controlled by cooling. Further treatment is carried out according to Example 4.

*Example 6*

45 ml. of acrylonitrile is dissolved in 450 ml. distilled water from which oxygen has been removed by boiling, cooling down and adding 1.3 gr. potassium pyrosulfite. Thereafter 40 ml. of a 5 percent sodium acetate solution, 6 ml. of a 5 percent potassium pyrosulfite solution, 4 ml. of a 0.1 percent copper dichloride-dihydrate solution and 13 ml. of a 4 percent potassium persulfate solution are added. The polymerization begins instantaneously after addition of the persulfate and is finished within 25 minutes, whereat the temperature increases from 25 to 43.5°. The flask is not cooled and its content is left unstirred. The white precipitate of the polymer is then sucked off, washed six times with hot distilled water and dried at about 60°. The resulting crumbs are ground to fine powder, which is dissolved in a mixture of 50 ml. aqueous zinc chloride solution, d.=2.0, and 35 ml. aqueous calcium chloride solution, d.=1.43, under stirring and heating to about 60°. The viscous solution thus obtained is then deaerated, filtered and spun in the device shown in FIG. 1 and described in Example 1. The resulting fibre possesses the density of 1.18, is entirely free of voids and has good textile properties.

Although water is the least expensive coagulating and washing liquid, its coagulating capacity being easily regulable by changing its salt concentration, many other liquids capable of dissolving the used salts are utilizable, e.g. aqueous ethanol or a mixture of ethanol with n-butanol. Lower aliphatic alcohols may be used particularly as first partially coagulating bath, whereby the salt recuperation may be made easier.

Instead of rollers coated with porous material any other means for removing the adhering bath may be used, e.g. a strong stream of compressed air, either hot or cold; different means of this kind may be combined simultaneously. At high spinning rates, as for inst. from 80 to 120 m./min., the bath is flung off by centrifugal force from the coated rollers so that the drying effect is thereby enhanced.

I claim:

1. Method for manufacturing shaped articles such as fibres, filaments, ribbons, rods, tubes and similar from acrylonitrile polymers and copolymers dissolved in concentrated aqueous inorganic salt solutions, comprising treating said polymer solutions with coagulating bath, capable of dissolving said inorganic salts, so as to dissolve them but partially, removing the adhering bath from the surface of said shaped article, allowing the article to rest until it becomes elastic and rubbery, stretching the rubbery article and washing out at least a substantial part of remaining salts from said stretched article thereby substantially reducing the elasticity of the same.

2. Method for manufacturing shaped articles such as fibres, filaments, bands, rods, tubes and similar from acrylonitrile polymers and copolymers dissolved in concentrated aqueous inorganic salt solutions, comprising polymerizing acrylonitrile containing monomeric material in said inorganic salt solutions by means of a redox initiator under branching suppressing conditions, extruding the obtained polymer solution into a coagulating bath, capable of dissolving said inorganic salts, so as to dissolve them but partially from the shaped article, removing the adhering bath from the article surface, allowing said article to rest until it becomes elastic and rubbery, stretching the obtained rubbery article and washing out at least a substantial part of remaining salts from the stretched shaped article thereby substantially reducing the elasticity of the same.

3. Method according to claim 2 where the polymerization is carried out without stirring in a space directly joint with the spinning pump.

4. Method for manufacturing shaped articles such as fibres and filaments from acrylonitrile polymers and copolymers dissolved in concentrated aqueous inorganic salt solutions, comprising extruding the polymer solution through a spinneret provided with holes having a diameter of from 0.2 to 2.0 mm., through a layer of a non-coagulating medium allowing plastic extension into a coagulating bath capable of dissolving said inorganic salts so as to remove them but partially, removing the adhering bath from the surface of said shaped article, allowing said shaped article to rest exposed to air of relatively low moisture content until it becomes elastic and rubbery, stretching the rubbery article and washing out at least a substantial part of remaining salts thereof thereby substantially reducing the elasticity of the same.

5. Method for manufacturing shaped articles such as fibres and filaments from acrylonitrile polymers and copolymers dissolved in concentrated aqueous zinc chloride and calcium chloride solution, comprising polymerizing acrylonitrile containing monomeric material in said inorganic salt solutions by means of a redox initiator under branching suppressing conditions, extruding the obtained polymer solution from a spinneret provided with holes having a diameter of from 0.2 to 2.0 mm., through a layer of a non-coagulating medium allowing plastic extension into a coagulating bath capable of dissolving said inorganic salts so as to remove them but partially, removing the adhering bath from the surface of said shaped article, allowing said shaped article to rest exposed to air of relatively low moisture content until it becomes elastic and rubbery, stretching the rubbery article and washing out at least a substantial part of remaining salts thereof thereby substantially reducing the elasticity of the same.

6. Method for manufacturing shaped articles, such as fibres, filaments, bands, rods, tubes and similar from acrylonitrile polymers and copolymers dissolved in concentrated aqueous inorganic salt solutions, comprising treating said polymer solutions with coagulating bath capable of dissolving said inorganic salts so as to remove them but partially in order to obtain a partially coagulated article containing from about 15 to 30 percent of polymeric substance, the balance being said salts and water, removing the adhering bath from the surface of said shaped article, allowing the article to rest exposed to air of relatively low moisture content until it becomes elastic and rubbery, stretching the rubbery article and washing out at least a substantial part of remaining salts from said stretched article thereby substantially reducing the elasticity of the same.

7. Method for manufacturing shaped articles such as fibres and filaments from acrylonitrile polymers and copolymers dissolved in concentrated aqueous inorganic salt solutions, comprising polymerizing acrylonitrile containing monomeric material in said inorganic salt solutions by means of a redox initiator under branching suppressing conditions, extruding the obtained polymer solution from a spinneret provided with holes having a diameter of from 0.2 to 2.0 mm., through a non coagulating medium, allowing the solution to be plastically extended, into a coagulating bath capable of dissolving said inorganic salts so as to remove them but partially in order to obtain a partially coagulated article containing from about 15 to 30 percent of polymeric substance, the balance being said salts and water, removing the adhering bath from the surface of said shaped article, allowing the article to rest exposed to air of relatively low moisture content until it becomes elastic and rubbery, stretching the rubbery article and washing out at least a substantial part of remaining salts from said stretched article thereby substantially reducing the elasticity of the same.

8. Method for manufacturing shaped articles such as fibres, filaments, bands, rods, tubes and similar from acrylonitrile polymers and copolymers dissolved in concentrated aqueous inorganic salt solutions, comprising treating said polymer solutions with coagulating bath capable of dissolving said inorganic salts so as to obtain partially coagulated article containing from about 15 to 30 percent of polymeric substance, the balance being said salts and water, removing the adhering bath from the surface of said shaped article by passing it between rollers coated with porous layer, further passing it continually through a drying chamber until it becomes elastic and rubbery, stretching the rubbery article and washing out at least a substantial part of remaining salts from said stretched article thereby substantially reducing the elasticity of the same.

9. Method for manufacturing shaped articles such as fibres and filaments from acrylonitrile polymers and copolymers dissolved in concentrated aqueous inorganic salt solutions, comprising continually polymerizing acrylonitrile containing monomeric material in said inorganic salt solutions by means of a redox initiator under branching suppressing condition, extruding the obtained polymer solution from a spinneret provided with holes having a diameter of from 0.2 to 2.0 mm. through a non-coagulating medium allowing plastic extension into a coagulating bath capable of dissolving said inorganic salts, so as to obtain partially coagulated article containing from about 15 to 30 percent of polymeric substance, the balance being said salts and water, removing the adhering bath from the surface of said shaped article by passing it continually between rollers coated with porous material, further passing it continually through a drying chamber until it becomes elastic and rubbery, stretching the rubbery article and passing it continually through washing liquid in order to remove at least a substantial part of remaining salts thereby substantially reducing the elasticity of the same.

10. Method for manufacturing acrylic fibres from solutions of the polymer in a concentrated aqueous solution of zinc chloride and calcium chloride, comprising treating said polymer solutions with coagulating bath, capable of dissolving said inorganic salts, so as to dissolve them but partially, removing the adhering bath from the surface of the partially coagulated fibre, applying finely powdered inert material thereon, allowing the fibres to rest without increasing the moisture content thereof until they become elastic and rubbery, stretching the rubbery fibres continually and washing them so as to remove at least a substantial part of remaining salts thereby substantially reducing the elasticity of the same.

11. Device for continually polymerizing monomeric acrylonitrile containing material in concentrated aqueous inorganic salt solutions, comprising a mixing chamber on the top of and integral with a cooled tube, said tube being provided in its lower part with a tightly fitting rotatory driven screw; a spinning pump; and a deaerating chamber interposed between and communicating with said lower part of said tube and said spinning pump.

References Cited in the file of this patent

UNITED STATES PATENTS

| | | |
|---|---|---|
| 1,910,879 | Bernstein | May 23, 1933 |
| 2,004,272 | Dreyfus | June 11, 1935 |
| 2,122,805 | Wulff | July 5, 1938 |
| 2,345,013 | Soday | Mar. 28, 1944 |
| 2,436,028 | Wiegerink | Feb. 17, 1948 |
| 2,648,647 | Stanton | Aug. 11, 1953 |
| 2,687,552 | Gabler | Aug. 31, 1954 |
| 2,721,785 | Zybert | Oct. 25, 1955 |
| 2,948,581 | Cummings | Aug. 9, 1960 |

FOREIGN PATENTS

| | | |
|---|---|---|
| 562,603 | Belgium | Dec. 14, 1957 |